United States Patent
Kondo (10) Patent No.: US 9,518,420 B2
(45) Date of Patent: Dec. 13, 2016

(54) SLIDE WINDOW FOR VEHICLE

(71) Applicants: ASAHI GLASS COMPANY, LIMITED, Tokyo (JP); NISSAN MOTOR LIGHT TRUCK CO., LTD., Saitama-shi (JP)

(72) Inventor: Takanobu Kondo, Tokyo (JP)

(73) Assignees: ASAHI GLASS COMPANY, LIMITED, Tokyo (JP); Nissan Motor Light Truck Co., Ltd., Saitama-shi (JP)

( * ) Notice: Subject to any disclaimer, the term of this patent is extended or adjusted under 35 U.S.C. 154(b) by 0 days.

(21) Appl. No.: 14/751,491

(22) Filed: Jun. 26, 2015

(65) Prior Publication Data

US 2015/0292257 A1    Oct. 15, 2015

Related U.S. Application Data

(63) Continuation of application No. PCT/JP2013/083878, filed on Dec. 18, 2013.

(30) Foreign Application Priority Data

Dec. 26, 2012    (JP) ................................ 2012-282415

(51) Int. Cl.
*E06B 3/46*    (2006.01)
*E05F 15/643*    (2015.01)
(Continued)

(52) U.S. Cl.
CPC .............. *E06B 3/4618* (2013.01); *B60J 1/005* (2013.01); *B60J 1/1853* (2013.01); *E05F 11/382* (2013.01);
(Continued)

(58) Field of Classification Search
CPC .......... E06B 3/4618; E06B 3/025; E06B 3/54; E06B 1/32; B60J 1/005; B60J 1/1853; E05F 15/00
(Continued)

(56) References Cited

U.S. PATENT DOCUMENTS 4,995,195 A * 2/1991 Olberding et al. ............. 49/118
5,826,377 A * 10/1998 Simson et al. .................. 49/362
(Continued)

FOREIGN PATENT DOCUMENTS

JP    61-163881 U    10/1986
JP    04-130510 U    11/1992

OTHER PUBLICATIONS

International Search Report dated Apr. 1, 2014 in PCT/JP2013/083878, filed Dec. 18, 2013.

*Primary Examiner* — Jerry Redman
(74) *Attorney, Agent, or Firm* — Oblon, McClelland, Maier & Neustadt, L.L.P.

(57) ABSTRACT

Provided herein is a slide window for a vehicle with which a slide panel can be smoothly moved to easily open and close an opening part without directly manipulating a slide panel 18. A movable body 36 that is moved by being driven by a drive unit 40 is provided, and the slide panel 18 is connected to the movable body 36 via a connection member 48. The slide panel 18 moves with the movement of the movable body 36 driven by the drive unit 40, whereby the opening part 14 is automatically opened and closed. The movable body 36 is guided by the guide sleeve 38, and moves along the slide panel 18. The guide sleeve 38 is positioned and mounted to the resin frame body 16 via guide sleeve brackets 42 provided on a resin frame body 16.

20 Claims, 10 Drawing Sheets (51) Int. Cl.
*B60J 1/00* (2006.01)
*B60J 1/18* (2006.01)
*E05F 11/38* (2006.01)
*E05F 15/632* (2015.01)
*E05F 15/00* (2015.01)
*E06B 1/32* (2006.01)
*E06B 3/02* (2006.01)
*E06B 3/54* (2006.01)

(52) U.S. Cl.
CPC ............ *E05F 15/00* (2013.01); *E05F 15/632* (2015.01); *E05F 15/643* (2015.01); *E06B 1/32* (2013.01); *E06B 3/025* (2013.01); *E06B 3/54* (2013.01); *E05Y 2201/43* (2013.01); *E05Y 2600/13* (2013.01); *E05Y 2600/61* (2013.01); *E05Y 2900/50* (2013.01); *E05Y 2900/55* (2013.01)

(58) Field of Classification Search
USPC .................................. 49/116, 118, 380, 413
See application file for complete search history.

(56) References Cited

U.S. PATENT DOCUMENTS

| | | | | |
|---|---|---|---|---|
| 6,038,819 | A * | 3/2000 | Klein | 49/362 |
| 6,119,401 | A * | 9/2000 | Lin et al. | 49/361 |
| 6,125,585 | A * | 10/2000 | Koneval et al. | 49/349 |
| 6,286,891 | B1 * | 9/2001 | Gage et al. | 296/166 |
| 6,324,788 | B1 * | 12/2001 | Koneval et al. | 49/121 |
| 6,591,552 | B1 | 7/2003 | Rasmussen | |
| 6,691,464 | B2 * | 2/2004 | Nestell et al. | 49/374 |
| 8,024,893 | B2 * | 9/2011 | Gillen | 49/360 |
| 8,578,654 | B2 * | 11/2013 | Rao et al. | 49/413 |
| 2006/0032140 | A1 * | 2/2006 | Arimoto et al. | 49/209 |
| 2009/0212591 | A1 | 8/2009 | Seiple et al. | |
| 2010/0122495 | A1 | 5/2010 | Lahnala | |
| 2010/0263290 | A1 * | 10/2010 | Pawloski et al. | 49/413 |
| 2012/0110915 | A1 * | 5/2012 | Lahnala | 49/413 |

\* cited by examiner

SLIDE WINDOW FOR VEHICLE

TECHNICAL FIELD

The present invention relates to a slide window for a vehicle.

BACKGROUND ART

As a framed opening member to be installed in an opening part of a vehicle such as an automobile, an opening member in which a resin frame is integrally molded with a glass plate at a periphery portion thereof is known. Such framed opening members are called "Module Assy Window (MAW®)", and have been used in many types of vehicles for their ability to reduce the number of assembly steps to a vehicle main body.

Patent Documents 1 and 2 describe framed opening members with a slidable open/close mechanism, specifically slide windows for a vehicle. The slide windows for a vehicle described in Patent Documents 1 and 2 include a frame with a fixed panel and a slide panel, and the slide panel is moved in a horizontal direction to cover and uncover an opening part.

BACKGROUND ART DOCUMENT

Patent Document

Patent Document 1: US 2010/0122495
Patent Document 2: US 2009/0212591

SUMMARY OF THE INVENTION

Problems that the Invention is to Solve

However, in order to move the slide panel to cover and uncover the opening part, Patent Documents 1 and 2 require a user to directly manipulate a handle or the like attached to the slide panel. Opening and closing of the opening part is thus not necessarily a convenient procedure, and can be troublesome.

One way to move a slide panel without requiring a user to directly manipulate it, is to, for example, separately provide a directly movable body guided by a guide member, and connect the slide panel to the movable body. In this way, because the movable body and the slide panel are connected to each other, moving the movable body can move the slide panel at the same time. For example, with a movable body provided with a tab etc., a user can move the slide panel by manipulating the tab, without directly manipulating the slide panel. Automatic movement of the slide panel can be achieved with a structure that moves the movable body with a driving means such as a motor.

However, in this case, the guide member that guides the movable body needs to be accurately mounted to smoothly open and close the slide panel. If not, it may cause malfunction, particularly when the slide panel is opened and closed automatically.

For accurate mounting, the guide member that guides the movable body needs to be mounted in an adjusted relationship with a guide member that guides the slide panel. However, this is a time-consuming procedure.

Accordingly, an object of the present invention is to provide a slide window for a vehicle with which a slide panel can be smoothly moved to easily open and close an opening part without directly manipulating the slide panel.

Means for Solving the Problems

The following means are provided for solving the foregoing problems.

A first aspect is a slide window for a vehicle, comprising: a window panel that includes a fixed panel and a slide panel, wherein the slide panel is capable of opening and closing an opening part of the window panel; a resin frame body provided at a periphery portion of the window panel; a first guide member that is provided in the resin frame body and movably guides the slide panel; a second guide member mounted to the resin frame body either directly or via other members; a movable body that is guided by the second guide member to move; a positioning member that positions the second guide member relative to the resin frame body to allow movement of the movable body along the slide panel; and a connecting means that connects the movable body and the slide panel to each other.

According to this aspect of the invention, the movable body that moves along the slide panel is provided on the resin frame body, and is connected to the slide panel via the connecting means. The slide panel can thus be moved by moving the movable body. This makes it possible to move the slide panel, and easily open and close the opening part without directly manipulating the slide panel. The movement of the movable body is guided by the second guide member. The second guide member is mounted to the resin frame body by being positioned with a positioning member provided in the resin frame body. The second guide member is positioned to allow movement of the movable body along the slide panel. In this way, the first guide member for guiding the slide panel, and the second guide member for guiding the movable body can be easily and accurately mounted to the resin frame body. This makes it possible to reduce the movement inaccuracy between the slide panel and the movable body, and smoothly move the slide panel with the movable body. The movable body may be moved manually, or automatically with the use of a driving means.

A second aspect is an aspect in which, in the slide window for a vehicle of the first aspect, the fixed panel and the first guide member are integrally molded with the resin frame body.

According to this aspect of the invention, the window panel and the first guide member are integrally molded with the resin frame body. As the integral molding method of the window panel, the first guide member and the resin frame body, for example, a production method according to an MAW method can be adopted.

A third aspect is an aspect in which, in the slide window for a vehicle of the second aspect, the resin frame body includes a positioning member mount that has a depressed shape and is fitted with the positioning member, and the positioning member is positioned and mounted to the resin frame body by being fitted to the positioning member mount.

According to this aspect of the invention, the positioning member mount for mounting the positioning member is provided in the resin frame body. The positioning member mount has a form of a depression that can fit the positioning member. The positioning member is positioned and mounted to the resin frame body by being fitted to the depression of the positioning member mount. This makes it possible to easily and accurately mount the positioning member, and smoothly move the slide panel. A mechanism for driving the slide panel also can be accurately mounted to the resin frame body.

A fourth aspect is an aspect in which, in the slide window for a vehicle of the second aspect, the positioning member further is integrally molded with the resin frame body.

According to this aspect of the invention, the window panel, the first guide member, the positioning member and the resin frame body are integrally molded. This eliminates the need to separately mount the positioning member, and the number of assembly steps can be reduced. The positioning member also can be accurately mounted to the resin frame body. As the integral molding method of the window panel, the first guide member, the positioning member and the resin frame body, for example, a production method according to the MAW method can be adopted.

A fifth aspect is an aspect in which, in the slide window for a vehicle of the fourth aspect, the positioning member is mounted to the first guide member, and the positioning member is integrally molded with the resin frame body.

According to this aspect of the invention, the positioning member is mounted to the first guide member in advance. The first guide member with the positioning member is then integrally molded with the window panel and the resin frame body. This makes it possible to accurately mount the positioning member to the resin frame body. The strength of the positioning member also can be enhanced.

A sixth aspect is an aspect in which, in the slide window for a vehicle of any one of the first to fifth aspects, the positioning member has a positioning pin, the second guide member has a positioning hole to which the positioning pin is inserted, and the positioning pin is inserted into the positioning hole, thereby positioning the second guide member relative to the resin frame body.

According to this aspect of the invention, the positioning member includes a positioning pin. The second guide member includes a positioning hole to which the positioning pin is inserted. The second guide member is positioned by inserting the positioning pin into the positioning hole. This makes it possible to easily position the second guide member.

A seventh aspect is an aspect in which, in the slide window for a vehicle of the sixth aspect, the positioning pin has a screw portion to be coupled to a nut, and after inserting the positioning pin into the positioning hole, the positioning pin is coupled to the nut, whereby the second guide member is fixed to the positioning pin with the nut.

According to this aspect of the invention, the positioning pin has a screw portion, and the second guide member is fixed with the screw portion. This makes it possible to position and fix the second guide member at the same time, and efficiency mount the second guide member. Because the single member serves both the positioning and the fixing purposes, the configuration can be simplified.

An eighth aspect is an aspect in which, in the slide window for a vehicle of any one of the first to seventh aspects, the slide window for a vehicle further comprises a driving means that drives the movable body.

According to this aspect of the invention, a driving means that drives the movable body is further provided. This makes it possible to automatically move the slide panel, and automatically cover and uncover the opening part.

A ninth aspect is an aspect in which, in the slide window for a vehicle of the eighth aspect, the driving means is provided in a vehicle main body.

According to this aspect of the invention, the driving means that moves the movable body is provided in a vehicle main body. By excluding the driving means, the configuration of the slide window for a vehicle can be simplified while still allowing the slide window for a vehicle to be easily assembled into the vehicle main body with the driving means.

Incidentally, in the present specification "resin frame body" refers to gaskets, moldings, weather strips sealing rubbers and the like, mounted at a periphery portion of a window panel to close the gap between a vehicle window frame and the slide window for a vehicle. The resin frame body may be provided throughout the entire edge portions of the window panel, or discontinuously in parts of the edge portions, or along one or several sides of the window panel.

Materials of the resin frame body may be appropriately selected from various synthetic resins, and thermoplastic resins may preferably be used. Examples of the thermoplastic resins include common thermoplastic resins selected from vinyl chloride resin (PVC; polyvinyl chloride) and various polyolefin-based, polyester-based, polystyrene-based, polyamide-based and polyurethane-based elastomers, but are not limited thereto.

"Window panel" is typically a transparent glass plate configured from a fixed panel and a slide panel, and is substantially rectangular in shape. The shape thereof may be appropriately changed according to the vehicle design, and the shape of the opening part, and may be trapezoidal or triangular, or asymmetrical. Materials of the window panel may be, for example, a transparent or semi-transparent glass plate or resin plate, and also may be, for example, a chromatic glass plate or resin plate.

"Slide panel" and "fixed panel" may have components such as a gasket, a locking mechanism, and a handle on a surface or periphery portion thereof.

The slide window for a vehicle may include a decoration member in the resin frame body etc. The decoration member refers to a photoluminescent thin film of metals such as stainless steel and an aluminum alloy, and a thin plate member formed by adhering a glossy film on a surface of a hard resin with a double-sided adhesive tape, or by applying a glossy coating on a surface of a hard resin.

Advantage of the Invention

According to the present invention, it is possible to smoothly move a slide panel to easily open and close the opening part without directly manipulating the slide panel.

MODE FOR CARRYING OUT THE INVENTION

Preferred embodiments of a slide window for a vehicle according to the present invention are described below with reference to the accompanying drawings.

Figure 1:
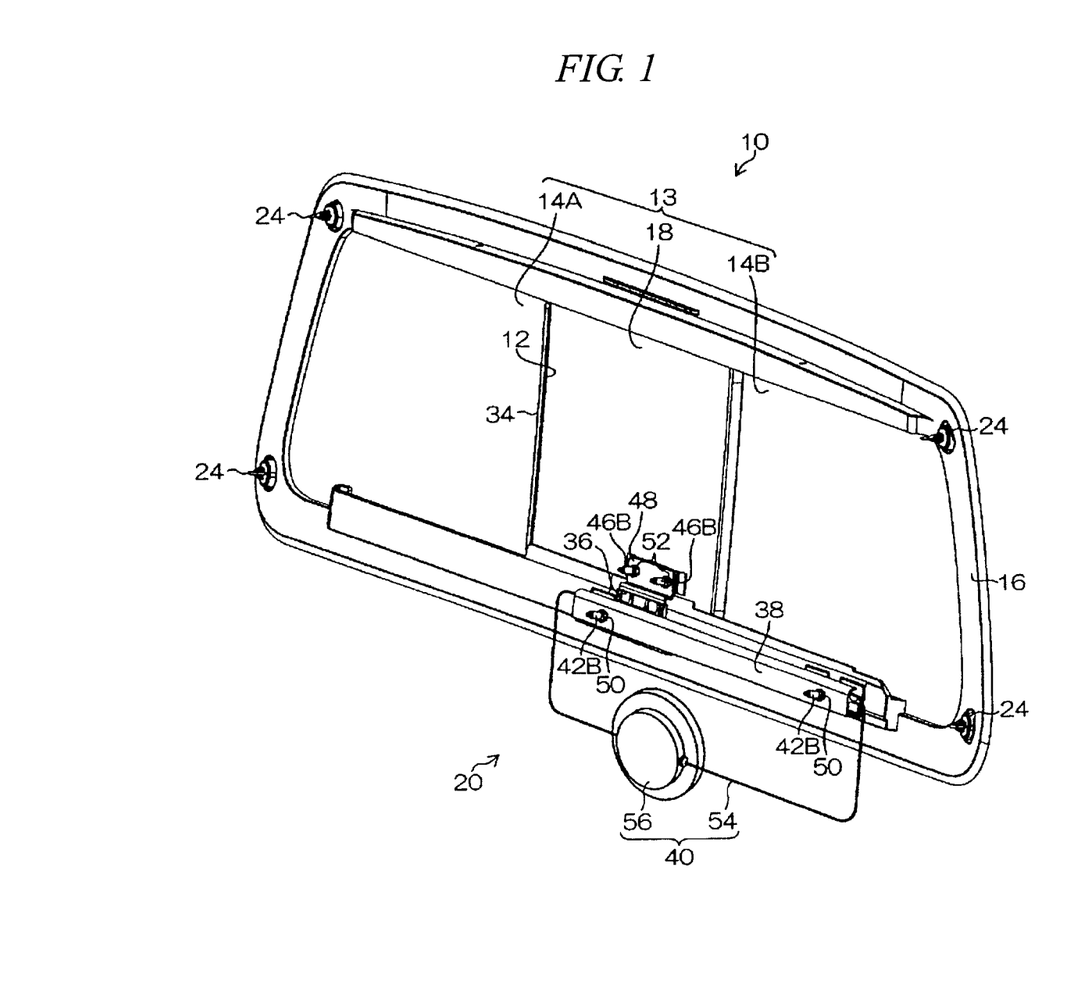
FIG. 1 is a perspective view showing an embodiment of a slide window for a vehicle according to the present invention.

FIG. 1 is a perspective view showing an embodiment of a slide window for a vehicle according to the present invention.

The slide window for a vehicle constitutes a window portion of a vehicle by being assembled into a window frame of a vehicle main body.

Referring to the figure, a slide window 10 for a vehicle is a slide window for a vehicle assembled into a rear window frame of a pickup truck to form a rear window portion (also known as backlite), and the main components include a window panel 13 with an opening part 12, and a resin frame body 16 provided at the periphery portion of the window panel 13. The window panel 13 includes fixed panels 14A and 14B, and a slide panel 18 for opening and closing the opening part 12, as will be described later. The slide window 10 for a vehicle includes a slide drive mechanism 20 for driving the slide panel 18.

Figure 2:
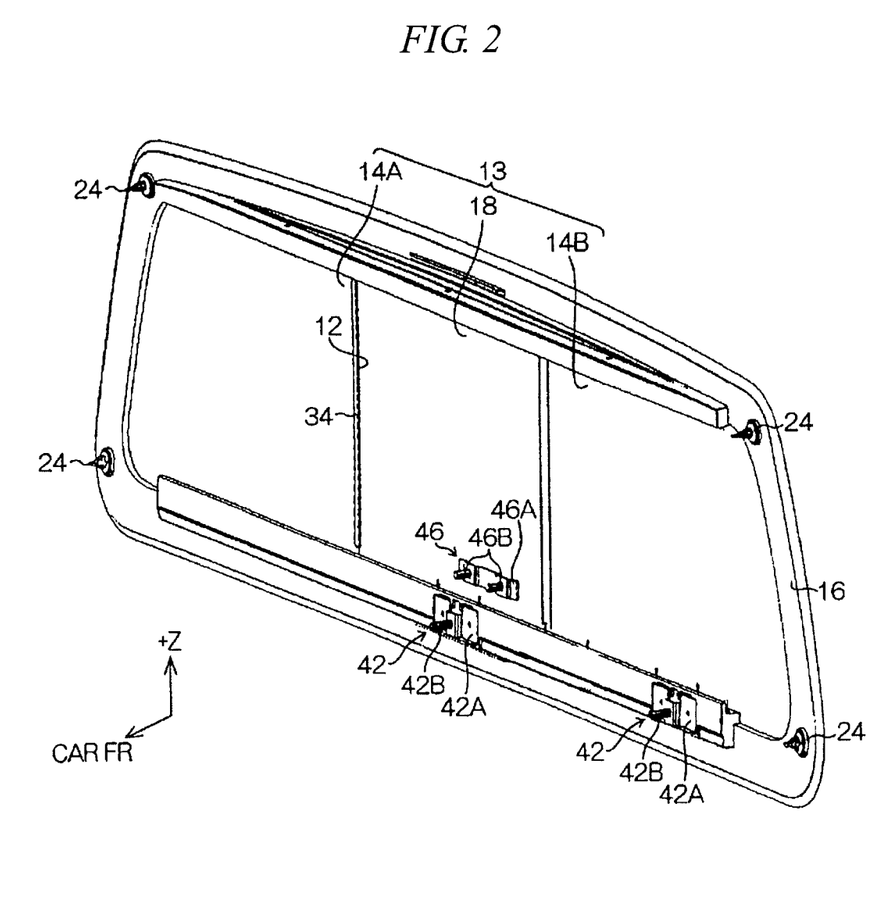
FIG. 2 is a perspective view showing a configuration of a relevant portion of the slide window for a vehicle shown in FIG. 1.
Figure 3:
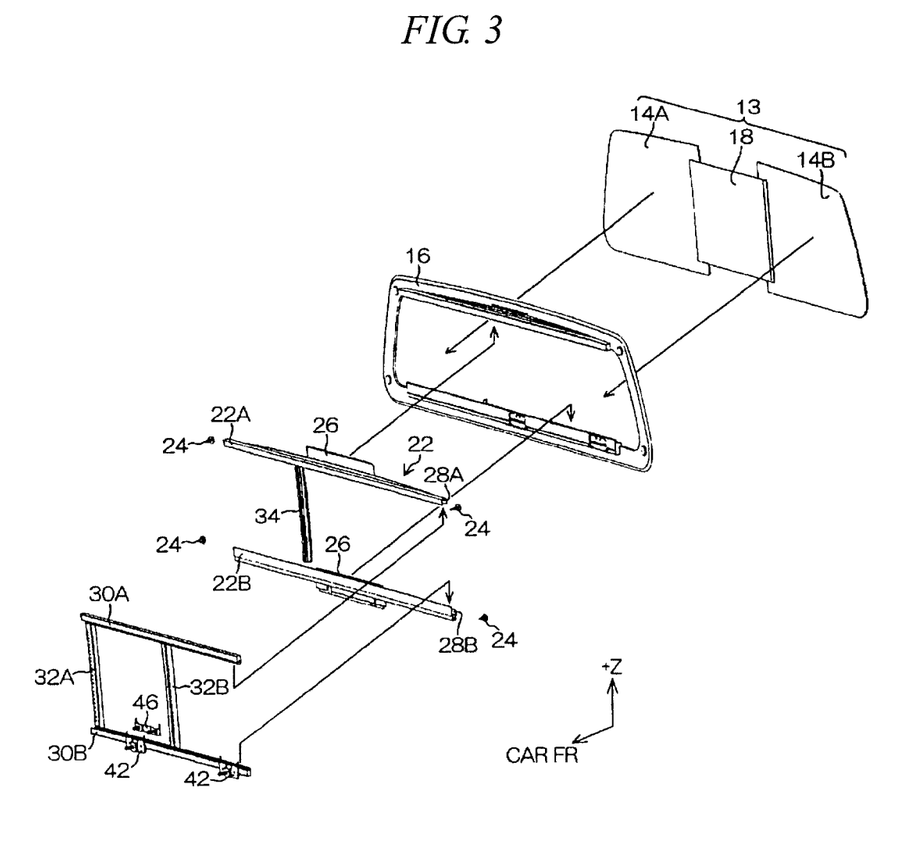
FIG. 3 is an exploded perspective view showing a configuration of a relevant portion of the slide window for a vehicle shown in FIG. 1.

FIG. 2 is a perspective view showing the configuration of a relevant portion of the slide window for a vehicle, excluding the slide drive mechanism shown in FIG. 1. FIG. 3 is an exploded perspective view showing the configuration of a relevant portion of the slide window for a vehicle, excluding the slide drive mechanism shown in FIG. 1.

The window panel 13 is configured by combining the pair of fixed panels 14A and 14B, and the slide panel 18 as described above. The pair of fixed panels 14A and 14B is disposed side by side with a certain distance therebetween. The opening part 12, substantially rectangular in shape, is formed between the pair of fixed panels 14A and 14B upon integrally molding the resin frame body 16 with the pair of fixed panels 14A and 14B. The fixed panels 14A and 14B are configured from, for example, a transparent or semi-transparent glass plate or resin plate.

The resin frame body 16 is a member that closes the gap between the window panel 13 and the vehicle main body. The resin frame body 16 is produced primarily from a thermoplastic resin. In the slide window 10 for a vehicle of the present embodiment, the resin frame body 16 is integrally molded with the pair of fixed panels 14A and 14B by a production method according to the MAW method.

As illustrated in FIGS. 2 and 3, in the slide window 10 for a vehicle of the present embodiment, slide-panel guide rails (first guide member) 22 for supporting the slide panel 18, and clips 24 used to assemble the slide window 10 for a vehicle into a vehicle main body are integrally molded when molding the resin frame body 16, and a garnish 26 provided as a decoration member is attached to the resin frame body 16 with a double-sided adhesive tape or the like after the integral molding. The garnish 26 may be formed as an integral unit with the resin frame body.

The slide-panel guide rails (first guide member) 22 are a member that slidably supports the slide panel 18, and are configured to include an upper slide-panel guide rail 22A and a lower slide-panel guide rail 22B. The upper slide-panel guide rail 22A is disposed along the upper side portion of the resin frame body 16, and integrally molded with the resin frame body 16. The lower slide-panel guide rail 22B is disposed along the lower side portion of the resin frame body 16, and integrally molded with the resin frame body 16. The upper slide-panel guide rail 22A and the lower slide-panel guide rail 22B integrally molded with the resin frame body 16 lie on the same plane, substantially parallel to each other.

On the opposing surfaces of the upper slide-panel guide rail 22A and the lower slide-panel guide rail 22B are provided guide channels 28A and 28B, respectively, for guiding the slide panel 18. The slide-panel guide rails 22 movably support the slide panel 18 with the upper and lower edge portions of the slide panel 18 being fitted to the guide channel 28A and the guide channel 28B of the upper slide-panel guide rail 22A and the lower slide-panel guide rail 22B, respectively.

The upper slide-panel guide rail 22A and the lower slide-panel guide rail 22B are made by using, for example, a metal such as aluminum.

The clips 24 is a member used to temporarily hold the slide window 10 for a vehicle when assembling the slide window 10 for a vehicle into a vehicle main body, and are disposed at the four corners of the resin frame body 16.

The garnish 26 as a decoration member is configured from, for example, a hard resin or a metal plate, and is attached to the resin frame body 16 to close the upper and lower side portions of the opening part 12 of the window panel 13.

The slide panel 18 is a member that opens and closes the opening part 12 of the window panel 13, and has a form of a rectangular plate. As noted above, the slide-panel guide rails 22 movably support the slide panel 18 with the upper and lower edge portions of the slide panel 18 being fitted to the guide channel 28A and the guide channel 28B of the upper slide-panel guide rail 22A and the lower slide-panel guide rail 22B, respectively. The slide panel 18 is guided and moved by the slide-panel guide rails 22, thereby opening and closing the opening part 12. Here, for example, the slide panel 18 is described as being horizontally moved in a straight line; however, the way the slide panel 18 is moved is not limited, and the slide panel 18 may be moved obliquely or vertically, or in a curved or an arc path.

Sealing members 30A and 30B are attached to the guide channel 28A and the guide channel 28B of the upper slide-panel guide rail 22A and the lower slide-panel guide rail 22B, respectively. The sealing members 30A and 30B seal the gap between the slide panel 18 and the guide channels 28A and 28B.

Sealing members 32A and 32B are attached at the edges on the both sides of the slide panel 18. The sealing members 32A and 32B seal the gap between the slide panel 18 and the window panel 13.

A stopper member 34 for restricting the movement of the slide panel 18 is attached to the fixed panel 14A at the edge portion on the side of the opening part 12. The stopper member 34 contacts the slide panel 18, and restricts further movement of the slide panel 18 being moved to close the opening part 12. The slide panel 18 closes the opening part 12 as it contacts the stopper member 34.

As illustrated in FIGS. 1 and 3, the main components of the slide drive mechanism 20 include a movable body 36, a guide sleeve (second guide member) 38 for guiding the movement of the movable body 36, and a drive unit (driving means) 40 for driving the movable body 36 along the guide sleeve.

Figure 6:
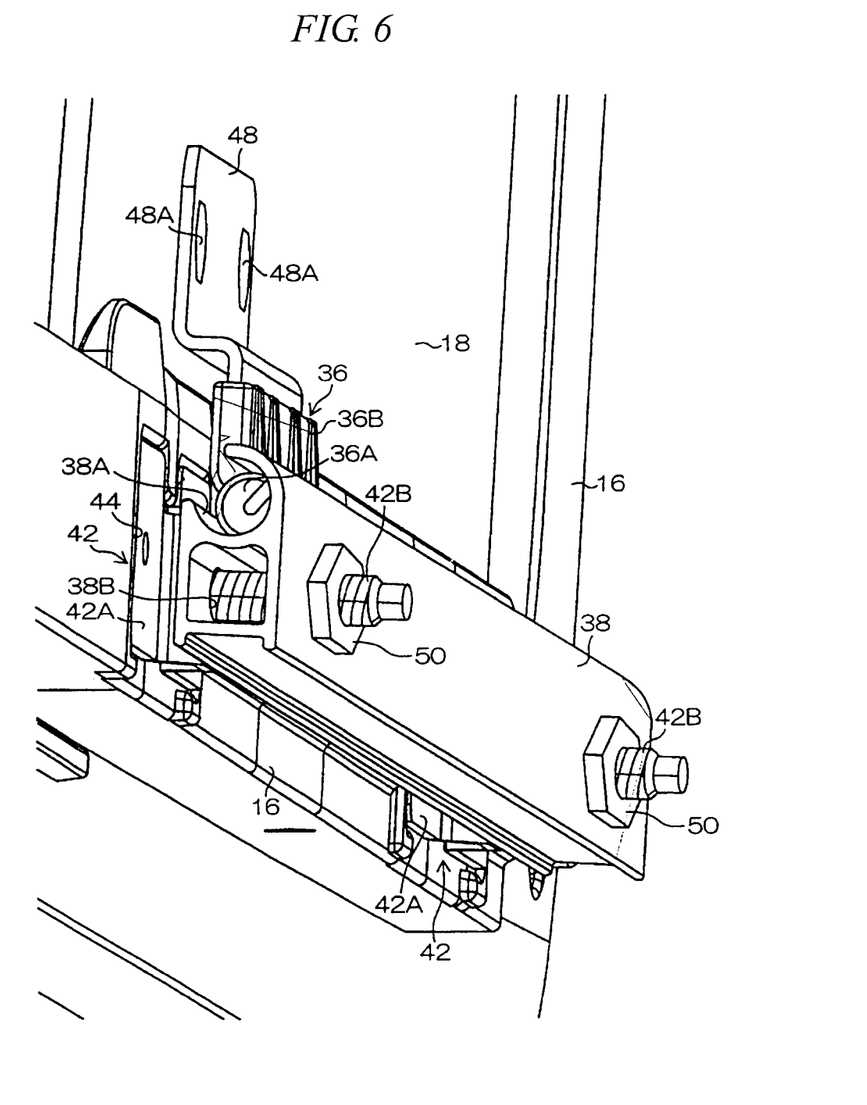
FIG. 6 is a perspective view showing a configuration of a relevant portion of the resin frame body of FIG. 5 with a guide sleeve.

As illustrated in FIG. 6, the movable body 36 is configured to include a columnar-shaped movable body main body 36A, and a movable body connecting portion 36B extending from the movable body main body 36A. The movable body 36 is made by using a metal such as aluminum.

The guide sleeve (second guide member) 38 is formed to be tubular in shape, and has a guide channel 38A formed therein to guide the movement of the movable body 36. The guide channel 38A is formed so as to correspond in shape to the outer shape of the movable body main body 36A, and has an arched cross section. The movable body 36 is guided along the guide channel 38A of the guide sleeve 38, and moves along the slide panel 18.

The guide sleeve 38 is mounted to the resin frame body 16 via a pair of guide sleeve brackets (positioning member) 42.

The guide sleeve brackets (positioning member) 42 are configured to include base portions 42A, and positioning pins 42B that perpendicularly extend from the base portions 42A.

The base portions 42A are formed to have a plate shape with a predetermined outer periphery shape. The guide sleeve brackets 42 are mounted to the resin frame body 16 by mounting and fixing the base portions 42A to the resin frame body 16.

Figure 4:
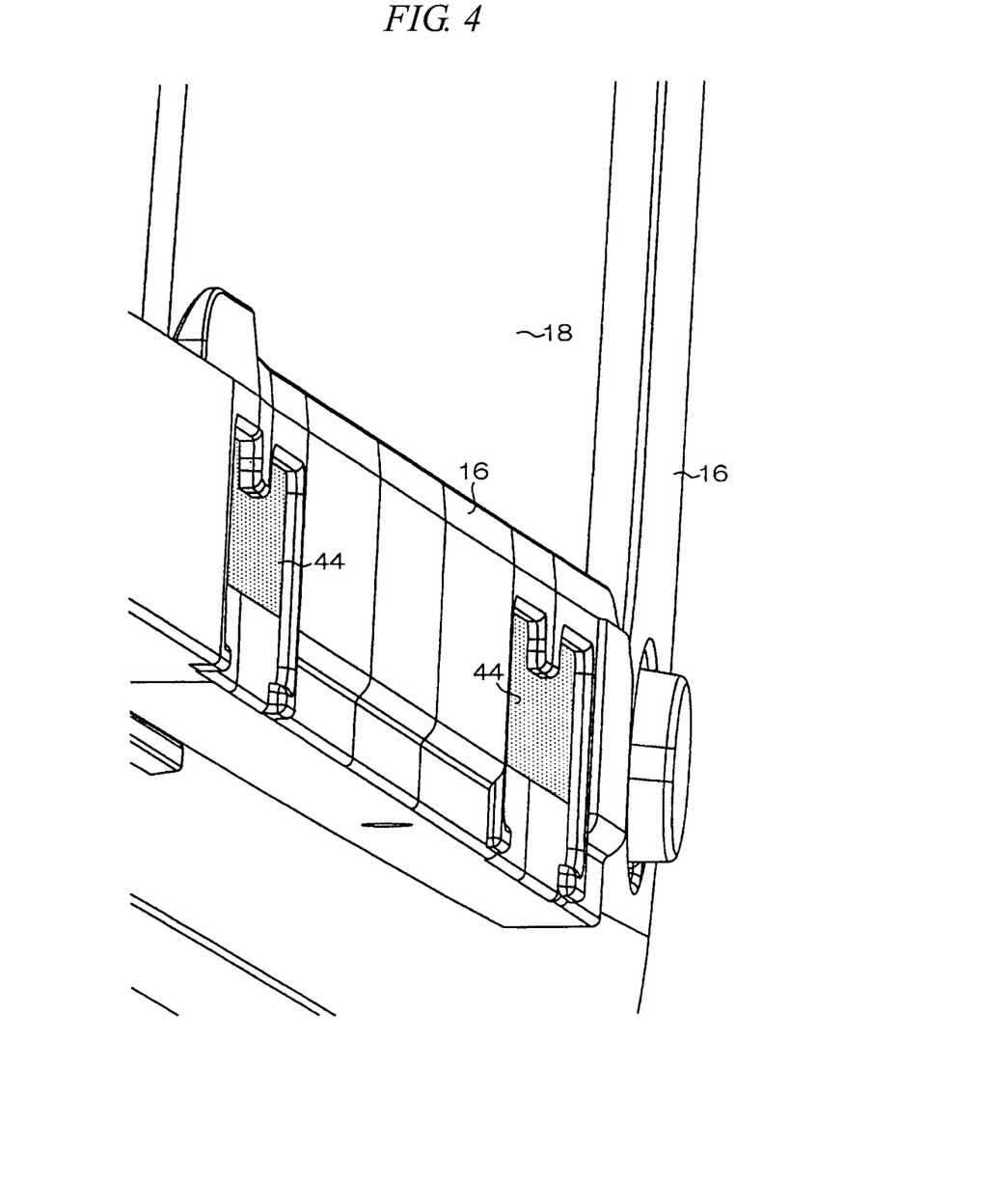
FIG. 4 is a perspective view showing a configuration of a relevant portion of the resin frame body shown in FIG. 1

FIG. 4 is a perspective view showing the configuration of a relevant portion of the resin frame body shown in FIG. 1. As illustrated in the figure, the resin frame body 16 has bracket mounts (positioning member mounts) 44 for mounting the base portions 42A at two locations thereof.

The bracket mounts 44 are formed as depressions with a predetermined inner periphery shape in the resin frame body 16. The bracket mounts 44 are formed at the molding of the resin frame body 16.

Figure 5:
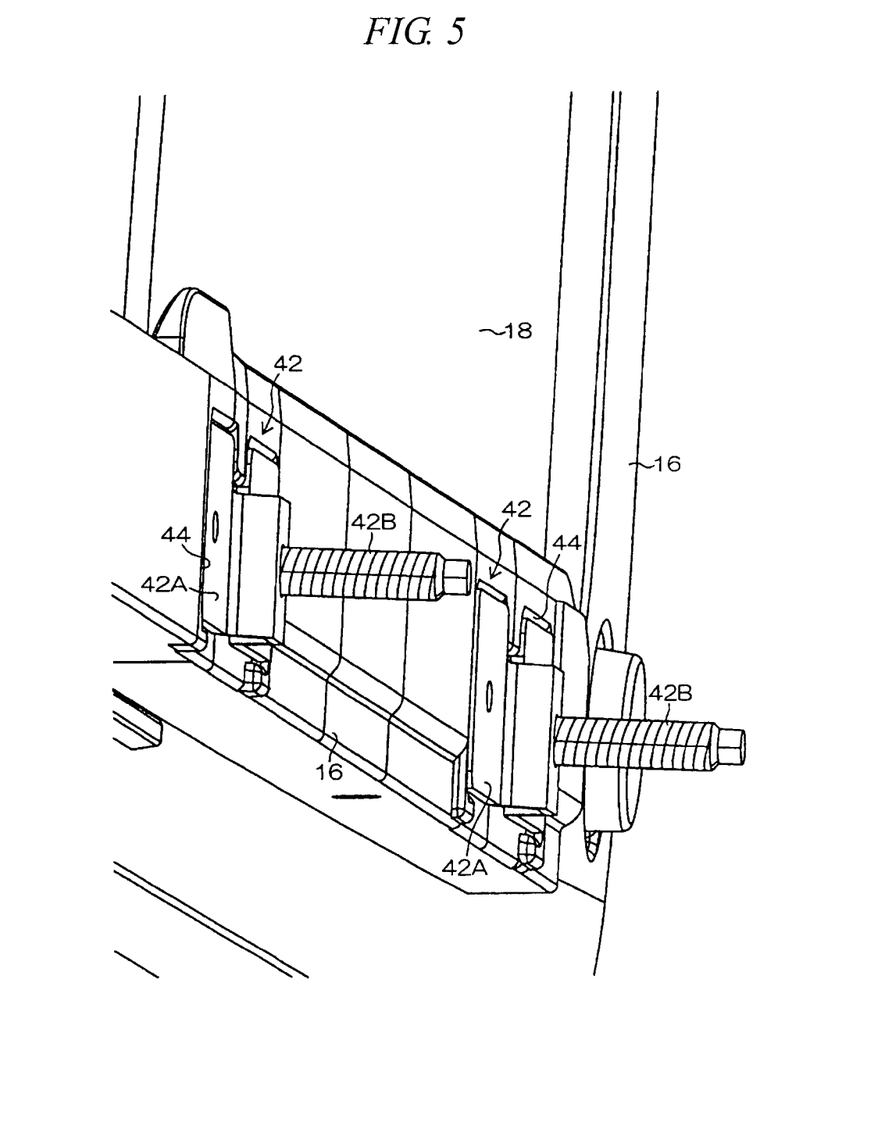
FIG. 5 is a perspective view showing a configuration of a relevant portion of the resin frame body of FIG. 4 with guide sleeve brackets.

FIG. 5 is a perspective view showing the configuration of a relevant portion of the resin frame body of FIG. 4 with the guide sleeve brackets.

As illustrated in the figure, the guide sleeve brackets 42 are positioned and mounted to the resin frame body 16 by fitting the base portions 42A in the depressions of the bracket mounts 44. Specifically, the bracket mounts 44 are formed to correspond in shape to the base portions 42A and to be able to fit to the base portions 42A. By fitting the base portions 42A to the bracket mounts 44, the mounting location and position of the guide sleeve brackets 42 relative to the resin frame body 16 are uniquely restricted, whereby the guide sleeve brackets 42 are positioned and mounted relative to the resin frame body 16.

The guide sleeve brackets 42 are fixed to the resin frame body 16 with an adhesive. Specifically, an adhesive is applied to the back surfaces of the base portions 42A, and adhered to the bottom surfaces of the bracket mounts 44 to fix the guide sleeve brackets 42 to the resin frame body 16. Aside from using an adhesive, the guide sleeve brackets 42 may be fixed to the resin frame body 16 with a double-sided adhesive tape or screws. Here, the guide sleeve 38 is described as being mounted to the resin frame body 16 via the guide sleeve brackets 42. However, the guide sleeve 38 may be directly mounted to the resin frame body 16, or may be mounted via other members such as the slide-panel guide rails (first guide member), as long as the guide sleeve 38 can be mounted relative to the resin frame body 16.

The positioning pins 42B are formed to have a columnar shape having a screw portion (bolt shape). With the guide sleeve brackets 42 mounted to the bracket mount 44, the positioning pins 42B are positioned to be orthogonal to the slide-panel guide rails 22.

The guide sleeve 38 is mounted to the guide sleeve brackets 42 by utilizing the positioning pins 42B.

FIG. 6 is a perspective view showing the configuration of a relevant portion of the resin frame body of FIG. 5 with the guide sleeve.

As illustrated in the figure, the guide sleeve 38 has positioning holes 38B to which the positioning pins 42B are inserted, and is mounted to the guide sleeve brackets 42 by inserting the positioning pins 42B into the positioning holes 38B and fitting nuts 50 to the positioning pins 42B.

The positioning holes 38B are provided in the guide sleeve 38 at two locations, corresponding to the positioning pins 42B. Specifically, the positioning holes 38B are formed at two locations of the guide sleeve 38 over the same distance as the positioning pins 42B. The positioning holes 38B are formed through the guide sleeve 38, and have an inner diameter that corresponds to the outer diameter of the positioning pins 42B. Specifically, The positioning holes 38B are formed so that the positioning pins 42B can be inserted through the positioning holes 38B without substantially any gap therebetween. In this way, when inserting the positioning pins 42B into the positioning holes 38B, the mounting location and position of the guide sleeve 38 relative to the guide sleeve brackets 42 are uniquely restricted, whereby the guide sleeve 38 is positioned and mounted relative to the guide sleeve brackets 42.

The guide sleeve 38 mounted to the resin frame body 16 via the guide sleeve brackets 42 is substantially parallel to the slide-panel guide rails 22. In this way, the movable body 36 is mounted so as to be able to move in a horizontal direction substantially parallel to the slide panel 18.

The movable body 36 and the slide panel 18 are connected to each other with a connection member 48. The connection member 48 is formed to have a stepped plate-shape, and one end thereof is fixed to the movable body connecting portion 36B of the movable body 36, and the other end thereof is fixed to a slide panel bracket 46 included in the slide panel 18.

The movable body connecting portion 36B has a slit (not illustrated) into which one end of the connection member 48 is fitted and inserted, and the one end of the connection member 48 is fitted and inserted into the slit. The end portion of the connection member 48 fitted and inserted into the slit is fixed to the movable body connecting portion 36B, thereby connecting the connection member 48 to the movable body connecting portion 36B. The connection member 48 may be fixed to the movable body connecting portion 36B with, for example, an adhesive or a pressure-sensitive adhesive tape. It is also possible to fix them by using other means such as welding and screwing.

The slide panel bracket 46 is configured to include a base portion 46A, and a pair of bolt portions 46B that perpendicularly extends from the base portion 46A.

The base portion 46A is formed to have a plate shape. The slide panel bracket 46 is mounted to the slide panel 18 by fixing the base portion 46A to the predetermined position of the slide panel 18. The base portion 46A is fixed to the slide panel 18 with, for example, an adhesive or a double-sided adhesive tape.

The pair of bolt portions 46B is provided perpendicular to the base portion 46A. With the slide panel bracket 46 mounted to the slide panel 18 via the base portion 46A, each bolt portion 46B is mounted at the predetermined location of the slide panel 18.

The connection member 48 has a pair of through holes 48A to which the pair of bolt portions 46B is inserted. The connection member 48 is fixed to the slide panel bracket 46 by inserting the pair of bolt portions 46B of the slide panel bracket 46 through the pair of through holes 48A, and fitting nuts 52 to each of the bolt portions 46B.

The movable body 36 is mounted so as to be movable substantially parallel to the slide panel 18, as described above. By connecting the movable body 36 and the slide panel 18 to each other with the connection member 48, they can move together. Specifically, by moving the movable body 36, the slide panel 18 also can be moved at the same time. In this way, the slide panel 18 can be slid without directly manipulating the slide panel 18. Since the movable body 36 is mounted to move along the slide panel 18, the slide panel 18 can smoothly move with the movement of the movable body 36.

The drive unit 40 is configured to include a driving cable 54 and a driving device 56.

The driving cable 54 is configured to include a tubular outer cable and an inner cable running inside the outer cable. One end of the inner cable is connected to one end of the movable body main body 36A, and the other end of the inner cable is connected to the other end of the movable body main body 36A.

The driving device 56 includes a motor (not illustrated), and the inner cable moves back and forth under the driving force of the motor. The driving device 56 is mounted to a vehicle main body (not illustrated).

The inner cable moved upon driving the driving device 56 pulls and moves the movable body 36 along the guide sleeve 38. This moves the slide panel 18 along the slide-panel guide rails 22, and opens and closes the opening part 12 of the window panel 13.

In the slide window 10 for a vehicle of the present embodiment, the pair of fixed panels 14A and 14B and the slide-panel guide rails 22 etc. are integrally molded with the resin frame body 16. Therefore, the slide panel 18, the slide panel bracket 46, the guide sleeve brackets 42, and the slide drive mechanism 20 are mounted after the resin integral molding.

The slide panel 18 is mounted by fitting the slide panel 18 to the slide-panel guide rails 22 integrally molded with the resin frame body 16.

The slide panel bracket 46 is mounted by, for example, being adhered to the predetermined position of the slide panel 18 mounted in the slide window 10 for a vehicle. The slide panel bracket 46 may be mounted before mounting the slide panel 18 to the slide window 10 for a vehicle.

The guide sleeve brackets 42 are mounted by, for example, being adhered to the bracket mounts 44 provided in the resin frame body 16. As illustrated in FIG. 4, the bracket mounts 44 are formed as depressions capable of fitting to the base portions 42A of the guide sleeve brackets 42. The guide sleeve brackets 42 are positioned and mounted to the resin frame body 16 by fitting the base portions 42A of the guide sleeve brackets 42 to the bracket mounts 44 formed as the depressions, as shown in FIG. 5.

The slide drive mechanism 20 is mounted after the slide window 10 for a vehicle is assembled into a vehicle main body (not illustrated). First, the driving device 56 is mounted to the mounting portion of the driving device 56 provided in the vehicle main body. The guide sleeve 38 is then mounted to the lower slide-panel guide rail 22B.

The guide sleeve 38 is mounted to the guide sleeve brackets 42 by inserting the positioning pins 42B into the positioning holes 38B and fitting the nuts 50 to the positioning pins 42B.

The guide sleeve 38 is positioned by inserting the positioning pins 42B into the positioning holes 38B. Specifically, the guide sleeve 38 is mounted substantially parallel to the slide-panel guide rails 22. The guide sleeve 38 is fixed to the guide sleeve brackets 42 by fitting the nuts 50 to the positioning pins 42B. Thereby, the guide sleeve 38 is fixed to the resin frame body 16.

The connection member 48 connects the movable body 36 and the slide panel 18 to each other while mounting the guide sleeve 38.

Here, one end of the connection member 48 is fixed to the movable body 36 in advance. The connection member 48 is fixed to the slide panel 18 by inserting the pair of bolt portions 46B of the slide panel bracket 46 into the pair of through holes 48A and then fitting the nuts 52 to each of the bolt portions 46B. Thereby, the movable body 36 is connected to the slide panel 18.

In the slide window 10 for a vehicle assembled as above, by driving the driving device 56, the inner cable of the driving cable 54 is move, and the movable body 36 is moved along the guide sleeve 38. Since the movable body 36 is connected to the slide panel 18 via the connection member 48, by moving the movable body 36, the slide panel 18 is also moved, whereby the opening part 12 of the window panel 13 is opened or closed.

According to the slide window 10 for a vehicle of the present embodiment, the opening part 12 of the window panel 13 automatically opens and closes in the manner described above. The opening part 12 can thus be opened and closed without directly manipulating the slide panel 18.

The slide panel 18 also can move smoothly since the guide sleeve 38 guiding the movable body 36 is positioned and mounted to the resin frame body 16 via the guide sleeve brackets 42.

According to the slide window 10 for a vehicle of the present embodiment, the guide sleeve brackets 42 for mounting the guide sleeve 38 are provided in the resin frame body 16, and the mounting and positioning thereof are performed at the same time. This enables easy and high accuracy mounting.

The guide sleeve brackets 42 for mounting the guide sleeve 38 can themselves also be accurately mounted to the predetermined positions simply by being fitted to the bracket mounts 44 provided in the resin frame body 16. This makes the mounting procedure easier.

The present embodiment has been described through the case where the driving device 56 is mounted to a vehicle main body in advance. However, the driving device 56 may be mounted to the mounting portion of the driving device 56 provided in a vehicle main body after the guide sleeve 38 is mounted to the lower slide-panel guide rail 22B.

<Variation 1>

Figure 7:
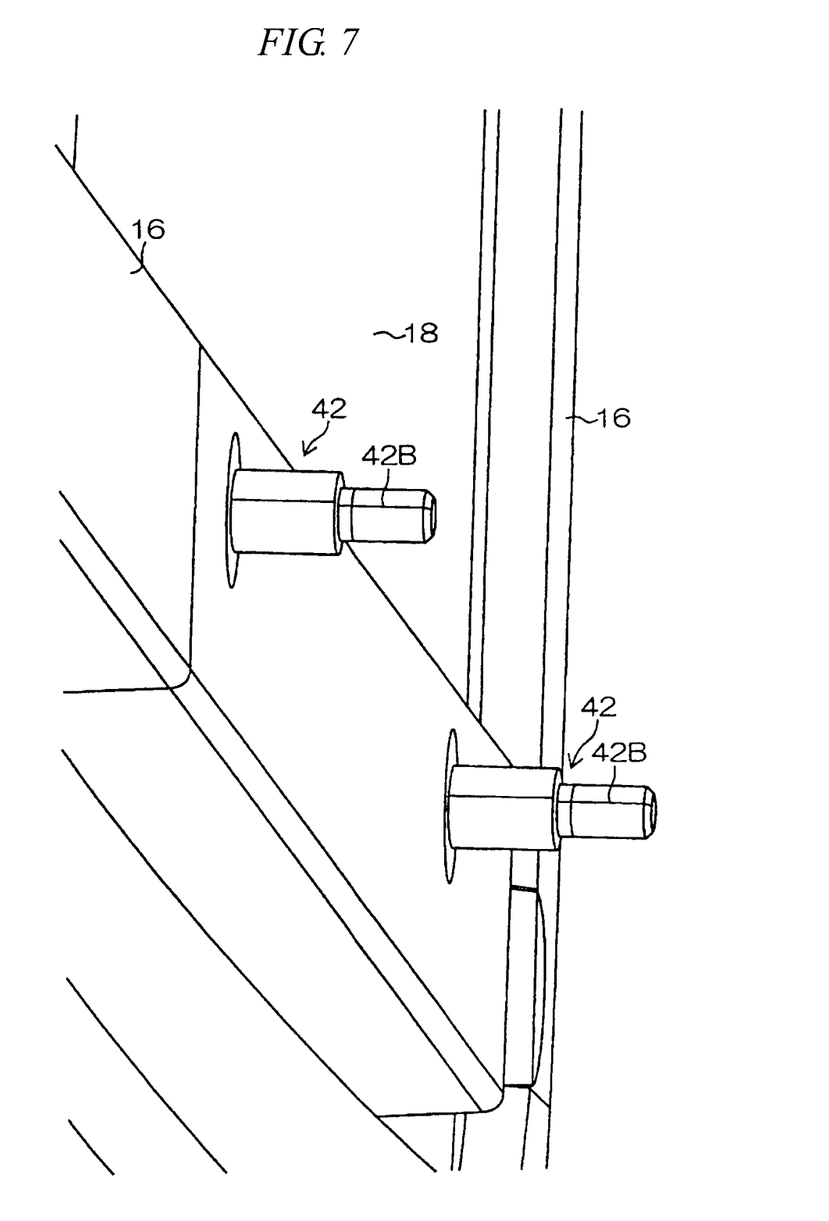
FIG. 7 is a perspective view showing a configuration of a relevant portion of another embodiment (variation 1) of the slide window for a vehicle.
Figure 8:
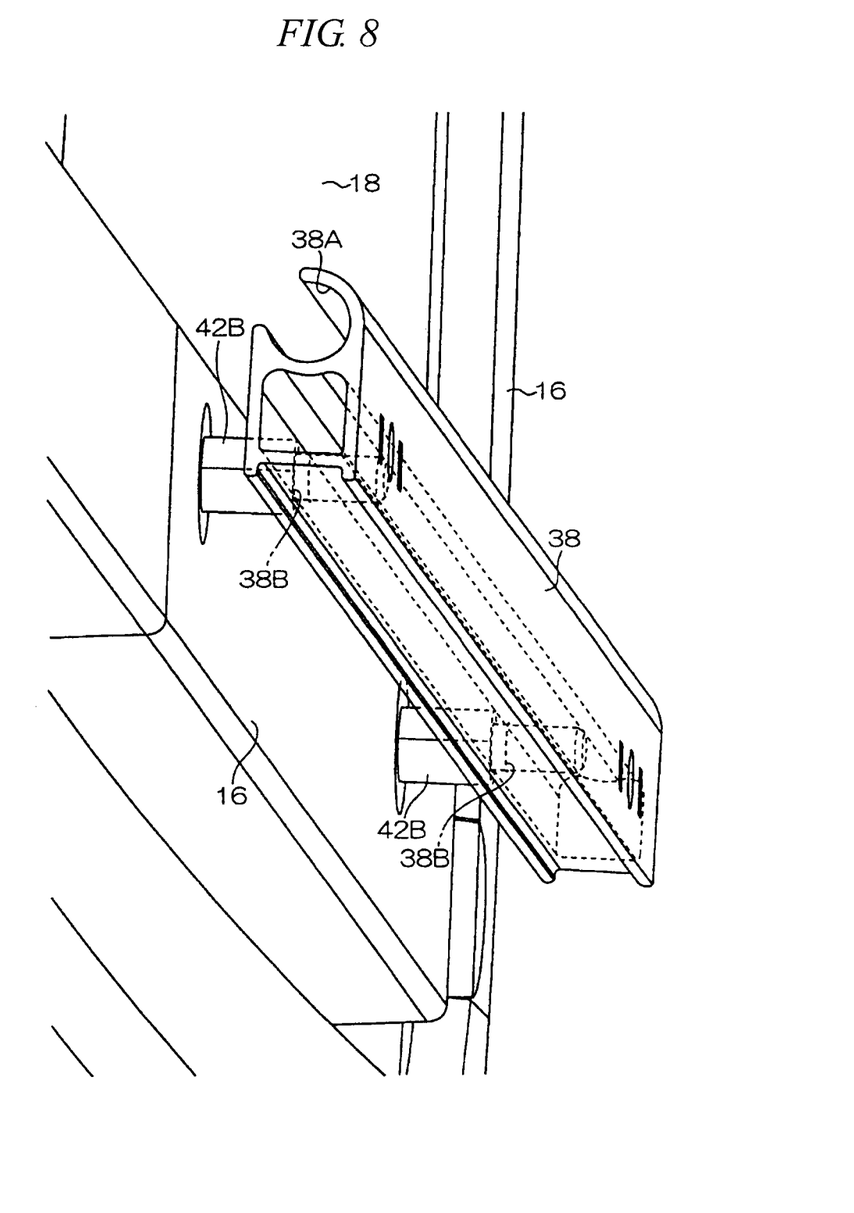
FIG. 8 is a perspective view showing a configuration of a relevant portion of another embodiment (variation 1) of the slide window for a vehicle.

FIGS. 7 and 8 are perspective views showing the configuration of a relevant portion of a slide window for a vehicle according to another embodiment (variation 1).

In the foregoing embodiment, the guide sleeve brackets 42 for positioning and mounting the guide sleeve 38 of the slide drive mechanism 20 to the resin frame body 16 are mounted to the resin frame body 16 afterwards. However, the guide sleeve brackets 42 may be configured as an integrally molded unit with the resin frame body 16. Specifically, the guide sleeve brackets 42 may be formed as an integral unit with the resin frame body 16 when molding the resin frame body 16 as with the fixed panels 14A and 14B of the window panel 13 and the slide-panel guide rails 22 etc.

As illustrated in FIG. 7, the guide sleeve brackets 42 are integrally molded with the resin frame body 16, with the positioning pins 42B solely projecting out of the surface of the resin frame body 16.

The guide sleeve 38 of the slide drive mechanism 20 is positioned and mounted to the resin frame body 16 by inserting the positioning pins 42B projected out of the resin frame body 16 into the positioning holes 38B.

In the foregoing embodiment, the positioning pins 42B are also used to fix the guide sleeve 38. However, the positioning pins may only serve the positioning purpose, and some other mechanism may be used for the purpose of fixing.

In the example represented in FIG. 7, the positioning pins 42B are configured to only serve to position the guide sleeve 38. In this case, the positioning pins 42B inserted through the positioning holes 38B only serve to position the guide sleeve 38 relative to the resin frame body 16, and the guide sleeve 38 is fixed by using some other mechanism, as shown in FIG. 8. For example, the guide sleeve 38 may be fixed to the resin frame body 16 with bolts and nuts, screws, or an adhesive.

In the embodiment represented in FIGS. 7 and 8, the positioning pins 42B each have a stepped portion having an expanded diameter at the base side thereof, and the guide sleeve 38 is positioned and mounted to the guide sleeve brackets 42 by contacting the side surfaces of the guide sleeve 38 to the end surfaces of the stepped portions.

By integrally molding the guide sleeve brackets 42 with the resin frame body 16 in advance as shown above, the labor required to separately mount the guide sleeve brackets 42 can be eliminated, and the assembly workability can be further improved.

<Variation 2>

Figure 9:
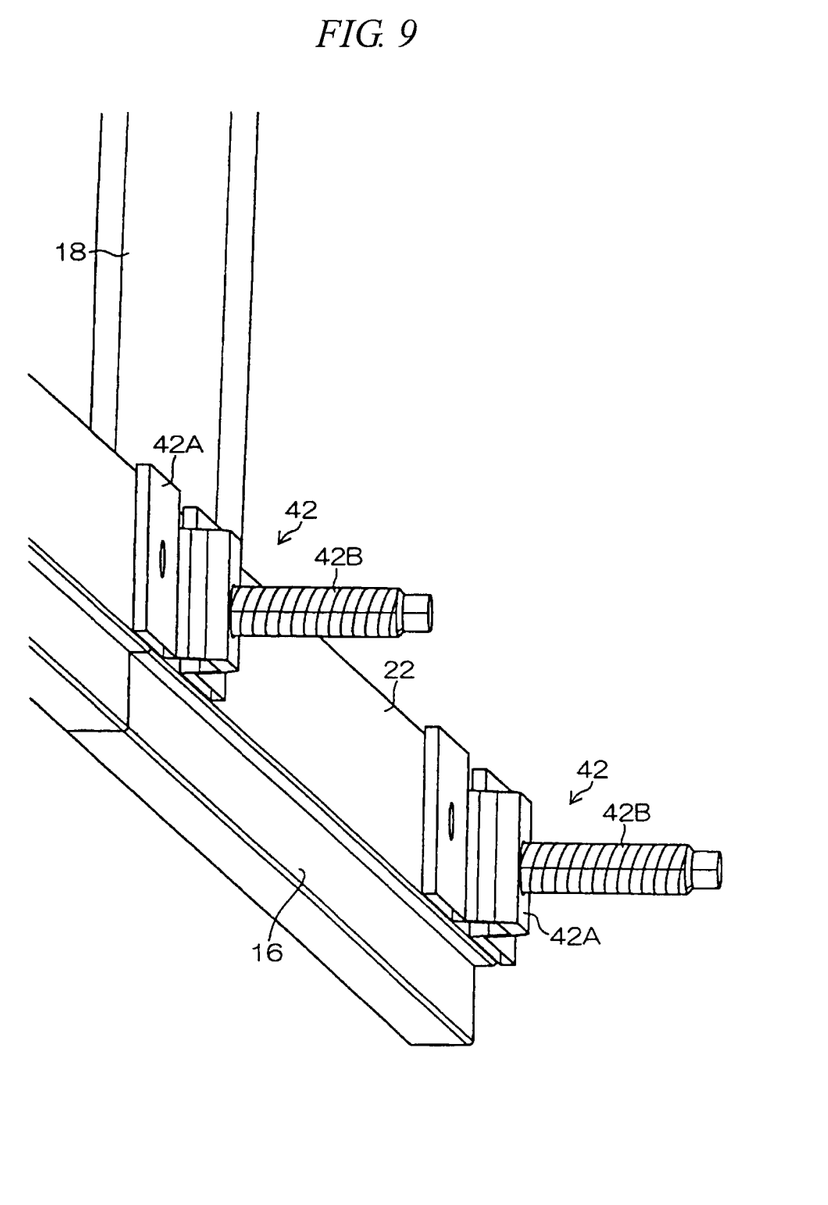
FIG. 9 is a perspective view showing a configuration of a relevant portion of another embodiment (variation 2) of the slide window for a vehicle.
Figure 10:
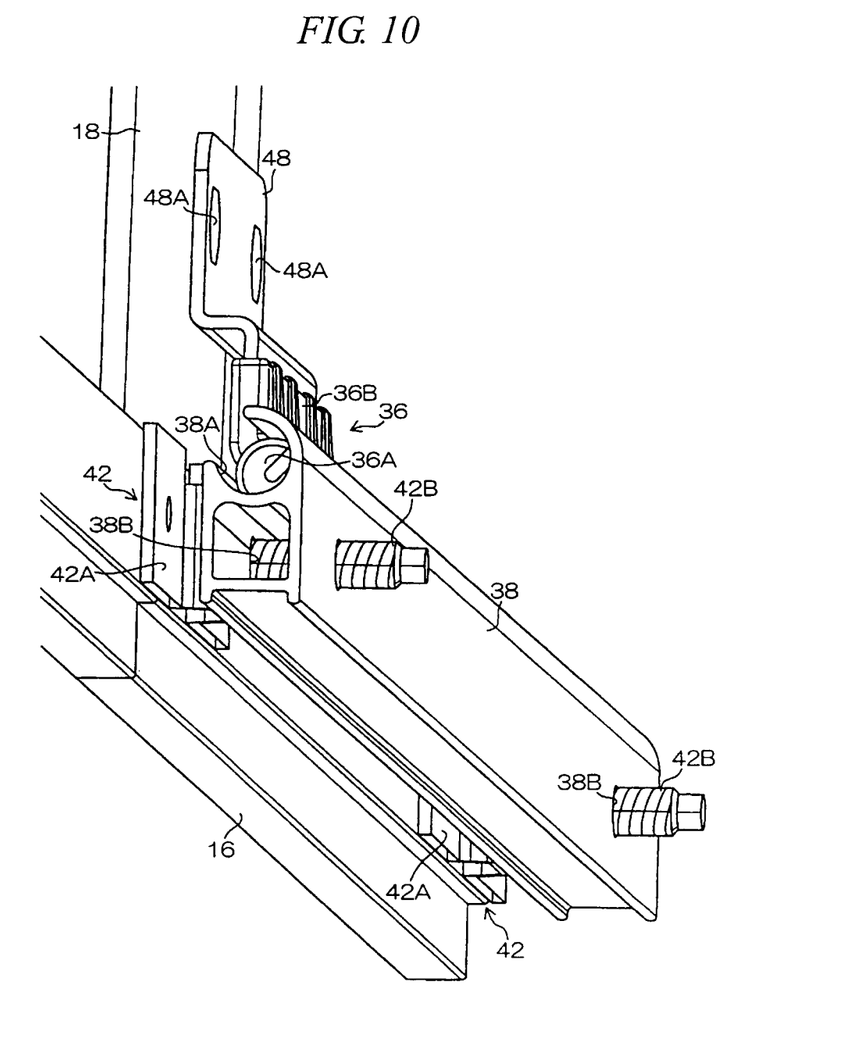
FIG. 10 is a perspective view showing a configuration of a relevant portion of another embodiment (variation 2) of the slide window for a vehicle.

FIGS. 9 and 10 are perspective views showing the configuration of a relevant portion of a slide window for a vehicle according to another embodiment (variation 2).

In the foregoing embodiment, the slide-panel guide rails 22 that movably support the slide panel 18 are integrally molded with the resin frame body 16. However, the slide-panel guide rails 22 may be configured as a separately mounted member on the resin frame body 16. In this case, the guide sleeve brackets 42 may be mounted to the slide-panel guide rails 22, and the guide sleeve 38 may be mounted to the guide sleeve brackets 42 mounting the slide-panel guide rails 22.

As illustrated in FIG. 9, the guide sleeve brackets 42 may be mounted to the slide-panel guide rails 22, for example, by being adhered with an adhesive or a double-sided adhesive tape, or by being welded or screwed. The slide-panel guide rails 22 with the guide sleeve brackets 42 are then mounted to the resin frame body 16. That is, the guide sleeve brackets 42 are mounted on the resin frame body 16. As illustrated in FIG. 10, the guide sleeve 38 is mounted to the guide sleeve brackets 42 mounted to the slide-panel guide rails 22, whereby the guide sleeve 38 is mounted to the resin frame body 16. In this case, the guide sleeve brackets 42 are mounted to the resin frame body 16 not directly, but via the slide-panel guide rails 22, and therefore, the two guide members, the guide sleeve 38 and the slide-panel guide rails 22, can be accurately mounted to obtain the same effect as described above.

The guide sleeve brackets 42 may be mounted to (integrally molded with) the resin frame body 16 by integrally molding the slide-panel guide rails 22 mounting the guide sleeve brackets 42 with the resin frame body 16.

<Other Variations>

In the foregoing embodiments, the driving means (drive unit 40) for moving the movable body 36 along the guide sleeve is provided to automatically open and close the opening part. However, the movable body 36 may be configured to be manually movable, without providing the driving means. In this case, for example, the movable body 36 may be provided with a tab or the like, and moved by holding such a structure. This makes it possible to open and close the opening part 12 without directly manipulating the slide panel 18.

When the driving means is provided for the movable body, the configuration of the driving means is not particularly limited, and the movable body may be driven for example, hydraulically, pneumatically, or mechanically, or with a linear motor or the like.

The foregoing embodiments describe the configuration in which the drive unit 40 as driving means is assembled into a vehicle main body. However, the driving means also may be mounted to the resin frame body.

The foregoing embodiments describe the configuration in which the cylindrical guide sleeve 38 (second guide member) is used to guide the movable body 36. However, the structure of the second guide member guiding the movable body is not limited to this, as long as the movable body 36 can be moved in a linear fashion.

The foregoing embodiments describe an application of the present invention in which the slide window for a vehicle is assembled into the rear window frame of a pickup truck. However, the present invention is not limited to this application. The present invention is also applicable to a slide window for a vehicle assembled into other window frames, such as a side window of a vehicle, provided that the opening part has the open and close mechanism.

The foregoing embodiments describe the example in which the resin frame body and the pair of fixed panels are integrally molded. However, the resin frame body and the window panel may be configured as separate members, and the resin frame body may be mounted to the window panel.

While there have been described certain embodiments of the invention in detail, it will be apparent to a skill person that various alterations and modifications may be made thereto without departing from the spirit and scope of the present invention.

The present application is based on Japanese Patent Application No. 2012-282415 filed on Dec. 26, 2012, the entire contents of which are hereby incorporated by reference.

DESCRIPTION OF REFERENCE NUMERALS AND SIGNS

10: Slide window for a vehicle
12: Opening
13: Window panel
14A and 14B: Fixed panels
16: Resin frame body
18: Slide panel
20: Slide drive mechanism
22: Slide-panel guide rail (first guide member)
22A: Upper slide-panel guide rail
22B: Lower slide-panel guide rail
24: Clips 26: Garnish
28A: Guide channel
28B: Guide channel
30A: Sealing member
30B: Sealing member
32A: Sealing member
32B: Sealing member
34: Stopper member
36: Movable body
36A: Movable body main body
36B: Movable body connecting portion
38: Guide sleeve (second guide member)
38A: Guide channel
38B: Positioning hole
40: Drive unit
42: Guide sleeve bracket
42A: Base portion
42B: Positioning pin
44: Bracket mount
46: Slide panel bracket
46A: Base portion
46B: Bolt portion
48: Connection member
48A: Through hole
50: Nut
52: Nut
54: Driving cable
56: Driving device

The invention claimed is:

1. A slide window for a vehicle, comprising:
a window panel having an opening portion and comprising a fixed panel and a slide panel such that the slide panel opens and closes the opening portion of the window panel;
a resin frame body positioned at a periphery portion of the window panel;
a first guide member that is provided in the resin frame body and guides the slide panel;
a second guide member mounted to the resin frame body;
a movable body that is guided by the second guide member;
a positioning member positioning the second guide member relative to the resin frame body such that the movable body moves along the slide panel; and
a connection member connecting the movable body and the slide panel to each other,
wherein the resin frame body is formed such that the resin frame body is integrally molding the fixed panel and the first guide member, the positioning member has a positioning pin, and the second guide member has a positioning hole to which the positioning pin is inserted such that the positioning pin is inserted into the positioning hole to position the second guide member relative to the resin frame body, and the positioning pin has a screw portion to be coupled to a nut such that the second guide member is fixed to the positioning pin with a nut coupled to the screw portion of the positioning pin.

2. The slide window for a vehicle according to claim 1, wherein the resin frame body includes a positioning member mount that has a depressed shape and is fitted with the positioning member, and the positioning member is positioned and mounted to the resin frame body by being fitted to the positioning member mount.

3. The slide window for a vehicle according to claim 2, wherein the positioning member mount is formed such that the positioning member mount has a shape corresponding to a shape of the positioning member.

4. The slide window for a vehicle according to claim 2, wherein the positioning member mount is formed such that the positioning member mount restricts a mounting location and position of the positioning member relative to the resin frame body.

5. The slide window for a vehicle according to claim 2, wherein the positioning hole has an inner diameter which is corresponding to an outer diameter of the positioning pin such that the positioning pin is inserted into the positioning hole without a gap between the positioning pin and the positioning hole.

6. The slide window for a vehicle according to claim 2, wherein the positioning member is mounted to the resin frame body through the first guide member.

7. The slide window for a vehicle according to claim 2, further comprising a driving unit comprising a driving device such that the driving unit drives the movable body.

8. The slide window for a vehicle according to claim 7, wherein the driving unit is positioned in a vehicle main body.

9. The slide window for a vehicle according to claim 2, further comprising driving means for driving the movable body.

10. The slide window for a vehicle according to claim 1, wherein the resin frame body is formed such that the resin frame body is integrally molding the positioning member.

11. The slide window for a vehicle according to claim 10, wherein the positioning member is mounted to the first guide member.

12. The slide window for a vehicle according to claim 10, further comprising a driving unit comprising a driving device such that the driving unit drives the movable body.

13. The slide window for a vehicle according to claim 12, wherein the driving unit is positioned in a vehicle main body.

14. The slide window for a vehicle according to claim 1, further comprising a driving unit comprising a driving device such that the driving unit drives the movable body.

15. The slide window for a vehicle according to claim 14, wherein the driving unit is positioned in a vehicle main body.

16. The slide window for a vehicle according to claim 1, wherein the positioning hole has an inner diameter which is corresponding to an outer diameter of the positioning pin such that the positioning pin is inserted into the positioning hole without a gap between the positioning pin and the positioning hole.

17. The slide window for a vehicle according to claim 1, wherein the positioning member is mounted to the resin frame body through the first guide member.

18. The slide window for a vehicle according to claim 1, further comprising driving means for driving the movable body.

19. The slide window for a vehicle according to claim 18, wherein the driving means is positioned in a vehicle main body.

20. A slide window for a vehicle, comprising:
a window panel having an opening portion and comprising a fixed panel and a slide panel such that the slide panel opens and closes the opening portion of the window panel;
a resin frame body positioned at a periphery portion of the window panel;
a first guide member that is provided in the resin frame body and guides the slide panel;

a second guide member mounted to the resin frame body;
a movable body that is guided by the second guide member;
a positioning member positioning the second guide member relative to the resin frame body such that the movable body moves along the slide panel; and
connecting means for connecting the movable body and the slide panel to each other,
wherein the resin frame body is formed such that the resin frame body is integrally molding the fixed panel and the first guide member, the positioning member has a positioning pin, and the second guide member has a positioning hole to which the positioning pin is inserted such that the positioning pin is inserted into the positioning hole to position the second guide member relative to the resin frame body, and the positioning pin has a screw portion to be coupled to a nut such that the second guide member is fixed to the positioning pin with a nut coupled to the screw portion of the positioning pin.

* * * * *